US011919741B2

(12) United States Patent
Kazama

(10) Patent No.: US 11,919,741 B2
(45) Date of Patent: Mar. 5, 2024

(54) SHEET STACKING APPARATUS AND LIQUID DISCHARGING APPARATUS

(71) Applicant: Ikumi Kazama, Kanagawa (JP)

(72) Inventor: Ikumi Kazama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 152 days.

(21) Appl. No.: 17/539,738

(22) Filed: Dec. 1, 2021

(65) Prior Publication Data

US 2022/0177255 A1 Jun. 9, 2022

(30) Foreign Application Priority Data

Dec. 7, 2020 (JP) ................................. 2020-202933

(51) Int. Cl.

*B65H 9/10* (2006.01)
*B26D 7/01* (2006.01)
*B65H 31/10* (2006.01)
*B65H 31/26* (2006.01)
*B65H 31/36* (2006.01)

(52) U.S. Cl.

CPC ............. *B65H 9/101* (2013.01); *B26D 7/015* (2013.01); *B65H 31/10* (2013.01); *B65H 31/26* (2013.01); *B65H 31/36* (2013.01); *B65H 2405/114* (2013.01); *B65H 2511/12* (2013.01)

(58) Field of Classification Search

CPC . B65H 1/04; B65H 9/10; B65H 9/101; B65H 31/20; B65H 31/34; B65H 2402/32; B65H 2403/40; B65H 2403/41; B65H 2405/114; B65H 2405/1144; B65H 2511/12

See application file for complete search history.

(56) References Cited

U.S. PATENT DOCUMENTS

| | | | | |
|---|---|---|---|---|
| 4,657,239 A * | 4/1987 | Ikesue | B65H 9/101 271/227 |
| 4,743,006 A * | 5/1988 | Bolle, Jr. | B65H 3/66 271/18.1 |
| 2008/0099974 A1 | 5/2008 | Nomura et al. | |
| 2015/0183606 A1* | 7/2015 | Nishi | B65H 31/02 271/234 |
| 2021/0300703 A1* | 9/2021 | Yoneyama | B65H 31/34 |
| 2021/0395033 A1 | 12/2021 | Kazama | |

FOREIGN PATENT DOCUMENTS

| | | |
|---|---|---|
| JP | 2006/124156 A | 5/2006 |
| JP | 2007/099430 A | 4/2007 |
| JP | 2008/105849 A | 5/2008 |

* cited by examiner

*Primary Examiner* — Prasad V Gokhale
(74) *Attorney, Agent, or Firm* — Harness, Dickey & Pierce P.L.C.

(57) ABSTRACT

A sheet stacking apparatus includes a pair of sheet alignment mechanisms disposed to face each other in a direction of conveyance of a sheet or in a direction orthogonal to the direction of conveyance. Each one of the pair of sheet alignment mechanisms includes an aligning member, an elastic member, a driver, and a driving source. The aligning member reciprocates with reference to the sheet. The elastic member extends due to reaction force generated in response to pressing force applied to an edge of the sheet by the aligning member when a size of the sheet is larger than a prescribed size. The driver is coupled to the aligning member via the elastic member. The driving source transfers a driving force to the driver.

4 Claims, 6 Drawing Sheets

SHEET STACKING APPARATUS AND LIQUID DISCHARGING APPARATUS

CROSS-REFERENCE TO RELATED APPLICATIONS

This patent application is based on and claims priority pursuant to 35 U.S.C. § 119(a) to Japanese Patent Application No. 2020-202933, filed on Dec. 7, 2020, in the Japan Patent Office, the entire disclosure of which is hereby incorporated by reference herein.

BACKGROUND

Technical Field

Embodiments of the present disclosure relate to a sheet stacking apparatus and a liquid discharging apparatus.

Related Art

Sheet stacking apparatuses are known in the art that are provided with an alignment mechanism used to align the edges of a sheet in a sheet container that stacks and stores sheet-shaped medium. Such a sheet-shaped medium may be referred to simply as a sheet in the following description. Apparatuses that discharge liquid onto a sheet output from a sheet stacking apparatus are known in the art. As an example of such liquid discharging apparatuses, image forming apparatuses that use the liquid discharged onto a sheet to form an image are also known in the art.

Mechanisms to align a sheet to the normal position in which sheet aligning members that reciprocate from outside of a sheet stacking position to edges of a sheet in the sheet stacking position to align the edges of the sheet at a normal position in a sheet aligning apparatus are also known in the art. As mechanisms to align the sheet to the normal position, in particular, mechanisms enhances correct alignment of the sheet in a lateral direction of the sheet orthogonal to a direction in which the sheet is conveyed and output are also known in the art.

As an example of the mechanism to align sheets, apparatuses are known in the art that includes a standby tray in which sheets are kept on standby, a tray disposed below the standby tray to stack therein sheets to be conveyed, a mechanism to align the sheets stacked on an output tray in a lateral direction of the sheets, a mechanism to perform post-processing a bundle of aligned sheets, and an output tray to which a bundle of post-processed sheets is ejected.

The aligning mechanism includes a first lateral aligning plate and a second lateral aligning plate sandwiching the sheet bundle. When the aligning mechanism aligns the sheet bundle, either the first lateral aligning plate or the second lateral aligning plate is temporarily fixed and the other one of the lateral aligning plates is moved in a lateral direction of the sheet bundle to align the sheet bundle.

SUMMARY

In an embodiment of the present disclosure, a sheet stacking apparatus includes a pair of sheet alignment mechanism disposed to face each other in a direction of conveyance of a sheet or in a direction orthogonal to the direction of conveyance. Each one of the pair of sheet alignment mechanism includes an aligning member, an elastic member, a driver, and a driving source. The aligning member reciprocates with reference to the sheet. The elastic member extends due to reaction force generated in response to pressing force applied to an edge of the sheet by the aligning member when a size of the sheet is larger than a prescribed size. The driver is coupled to the aligning member via the elastic member. The driving source transfers a driving force to the driver.

In another embodiment of the present disclosure, a liquid discharging apparatus includes the sheet stacking apparatus and a liquid discharger. The liquid discharger discharges liquid to the sheet conveyed and output from the sheet stacking apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
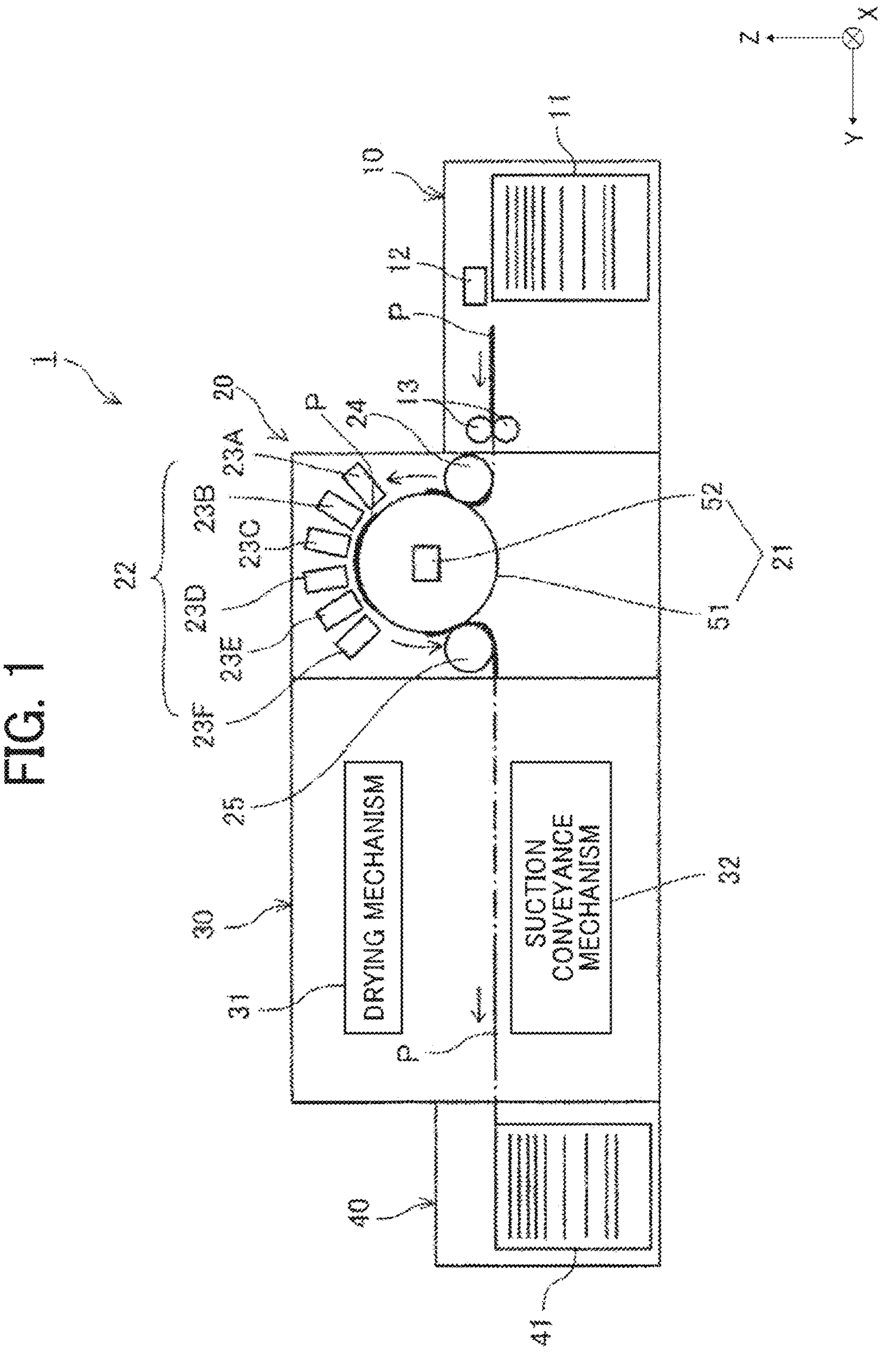
FIG. 1 is a schematic diagram illustrating an overall configuration of a liquid discharging apparatus including a sheet stacking apparatus, according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Hereinafter, embodiments of the present disclosure are described with reference to the drawings.

FIG. 1 is a schematic diagram illustrating an overall configuration of an image forming system 1 that includes a conveyance unit 10 and serves as a liquid discharging apparatus according to an embodiment of the present disclosure.

In the present embodiment, a sheet P is described as a sheet-shaped medium or material to be aligned or conveyed. However, the application of embodiments of the present disclosure is not limited to only a paper medium, and the embodiments of the present disclosure can be applied to any sheet-shaped medium such as a plastic sheet, a resin, or cloth.

As illustrated in FIG. 1, the image forming system 1 includes a conveyance unit 10, a 3C printer unit 20, a drier unit 30, and an ejection unit 40. In the image forming system 1, the printer unit 20 applies liquid to the sheet P conveyed from the conveyance unit 10 to perform printing as desired. Then, the drier unit 30 dries the liquid adhering to the sheet P and the sheet P is ejected to the ejection unit 40.

The conveyance unit 10 according to the present embodiment serves as a sheet stacking apparatus according to an embodiment of the present disclosure. The conveyance unit 10 also functions as a sheet conveyance device to convey the sheet P to the printer unit 20. The conveyance unit 10 includes a plurality of feed trays 11 serving as sheet stackers that stack the sheets P and accommodate the sheets P as a sheet bundle. The conveyance unit 10 includes a plurality of registration roller pairs 13 for feeding the sheets P to the printer unit 20, and a sheet feeder 12 for separating and feeding the sheets P one by one from the stacked sheet bundle.

The sheet feeder 12 performs, for example, air suctioning to cause the sheet P to be sucked and adhered to the conveyance belt in order to convey the sheet P. Alternatively, a device using a roller or a roller may be employed as the sheet feeder 12. After a front edge of the sheet P fed out from the feed tray 11 by the sheet feeder 12 reaches the multiple registration roller pairs 13, the multiple registration roller pairs 13 are driven at a predetermined timing. Thus, the sheet P is fed to the printer unit 20.

The printer unit 20 is a device that discharges the liquid as an image forming device, and includes a drum 51 and a suction device 52 for conveying the sheet P. The drum 51 is a rotator that rotates while carrying the sheet P on the circumferential surface of the drum 51. The suction device 52 is a suction device that generates suction force on the circumferential surface of the drum 51. Further, the printer unit 20 includes a liquid discharger 22 used to discharge the liquid toward the sheet P borne on the drum 51.

In the present embodiment, a conveyance direction of the sheet P conveyed from the conveyance unit 10 to the printer unit 20 is referred to as a Y direction. A stacking direction of the sheets P, which is a height direction of the image forming system 1, is referred to as a Z direction. A so-called width direction of the sheet P, which is a direction orthogonal to the Y direction and the Z direction, is referred to as an X direction.

The printer unit 20 includes a transfer cylinder 24 and a transfer cylinder 25. The transfer cylinder 24 receives the sheet P conveyed from the conveyance unit 10 and transfers the sheet P between the transfer cylinder 24 and the drum 51. The transfer cylinder 25 transfers the sheet P conveyed by the drum 51 to the drier unit 30.

The front edge of the sheet P that is conveyed from the conveyance unit 10 to the printer unit 20 is gripped by a sheet gripper that serves as a gripper provided for the transfer cylinder 24, and the sheet P is conveyed as the transfer cylinder 24 rotates. The sheet P that is conveyed by the transfer cylinder 24 is forwarded to the drum 51 at a position opposite the drum 51.

A sheet gripper serving as a gripper is also provided on the surface of the drum 51, and the front edge of the sheet P is gripped by the sheet gripper. On the surface of the drum 51, a plurality of suction holes are dispersedly formed. The suction device 52 generates a suction air flow directing inward of the drum 51 from desired suction holes of the drum 51.

The front edge of die sheet P that is transferred from the transfer cylinder 24 to the drum 51 is gripped by the sheet gripper, and the sheet P is sucked by the suction air flow of the suction device 52 and borne on the drum 51, and is conveyed with the rotation of the drum 51.

The liquid discharger 22 includes a plurality of liquid discharge units 23A, 23B, 23C. 23D, 23E, and 23F. For example, the liquid discharge unit 23A discharges cyan (C) liquid, the liquid discharge unit 23B discharges magenta (M) liquid, the liquid discharge unit 23C discharges yellow (Y) liquid, and the liquid discharge unit 23D discharges black (K) liquid. The liquid discharge units 23E and 23F are used to discharge any one of Y, M, C, and K liquids or a special liquid such as white, gold or silver. Further, a liquid discharge unit that discharges a treatment liquid such as a surface coating liquid may be provided.

Each of the liquid discharge units 23 of the liquid discharger 22 performs a liquid discharge operation by a drive signal corresponding to print data. When the sheet P borne on the drum 51 passes through a region facing the liquid discharger 22, the liquid of each color is discharged from die corresponding one of the liquid discharge units 23, and an image corresponding to the print data is formed on the surface of the sheet P.

The drier unit 30 includes a drying mechanism 31 to dry the liquid that has adhered to the sheet P in the printer unit 20 and a suction conveyance mechanism 32 to perform suctioning on the sheet P conveyed from the printer unit 20 while conveying the sheet P.

After the sheet P conveyed from the printer unit 20 is received by the suction conveyance mechanism 32, the sheet P is conveyed so as to pass through the drying mechanism 31 and forwarded to the ejection unit 40.

When the sheet P passes through the drying mechanism 31, the liquid on the sheet P is dried. Accordingly, a liquid component such as moisture in the liquid evaporates, and the colorant contained in the liquid is fixed on the sheet P. Additionally, curling of the sheet P is inhibited.

The ejection unit 40 includes an output tray 41 on which a plurality of sheets P is stacked. The sheets P that are conveyed from the drive unit 30 are sequentially stacked and held on the output tray 41.

In the image forming system 1, for example, a preprocessing device that performs pre-processing on the sheet P may be disposed on a position upstream from the printer unit 20, or a post-processing device that performs postprocessing on the sheet P to which the liquid has been adhered may be disposed between the drier unit 30 and the ejection unit 40.

For example, the pre-processing device may perform pre-coating processes to coat the sheet P with treatment liquid that reacts with the liquid to inhibit bleeding. Examples of the post-processing device include a device that performs sheet reverse conveyance processing in which the sheet P printed by the printer unit 20 is reversed and re-sent to the printer unit 20 to print on both sides of the sheet P, or a process for binding a plurality of sheets P.

Next, details of the conveyance unit 10 of the sheet stacking apparatus according to an embodiment of the present disclosure is described.

Figure 2:
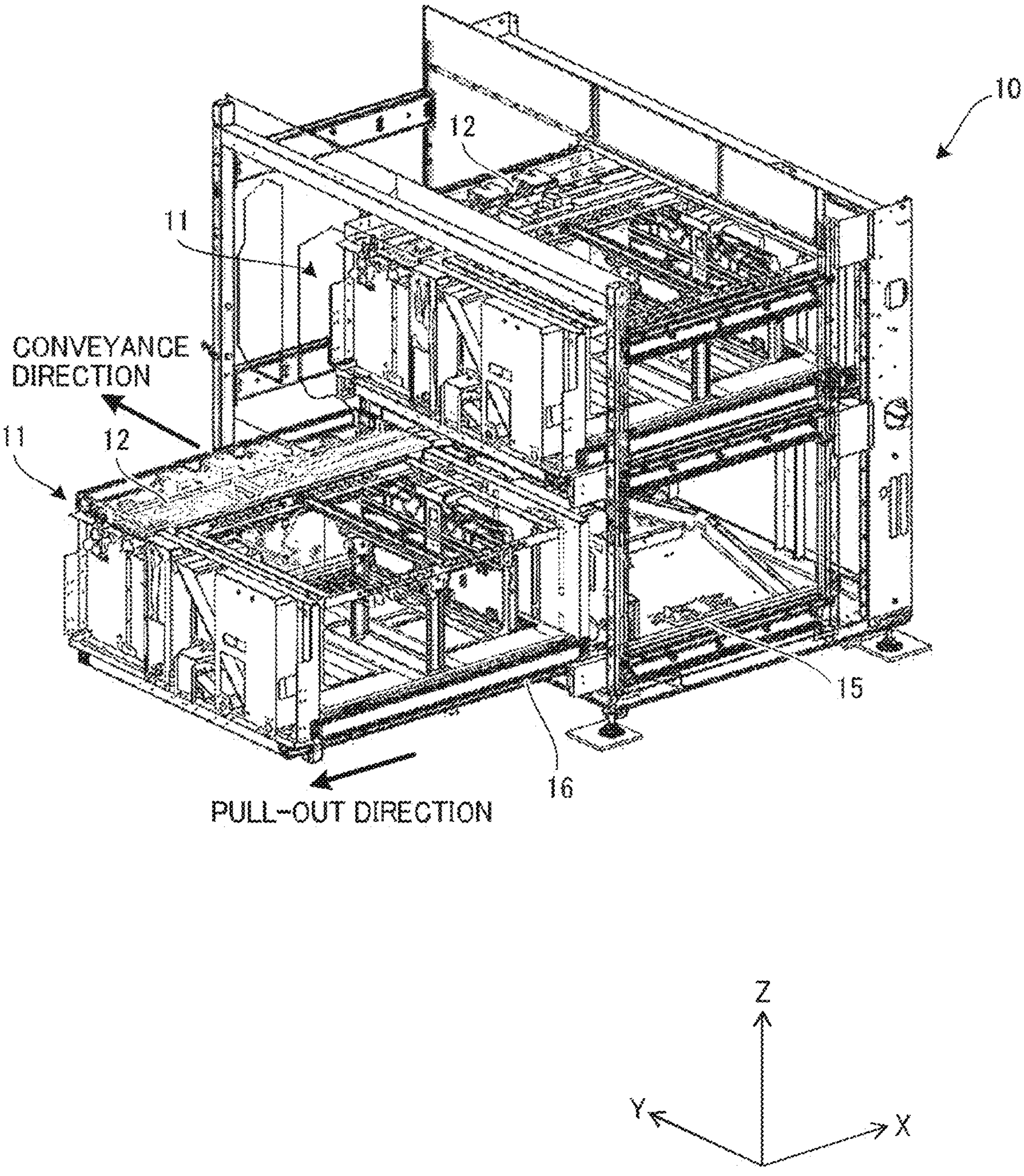
FIG. 2 is a perspective internal view of a sheet stacking apparatus that serves as a conveyance unit, according to an embodiment of the present disclosure.

FIG. 2 is a perspective internal view of the conveyance unit 10 that serves as the sheet stacking apparatus 10, according to the present embodiment.

Figure 3:
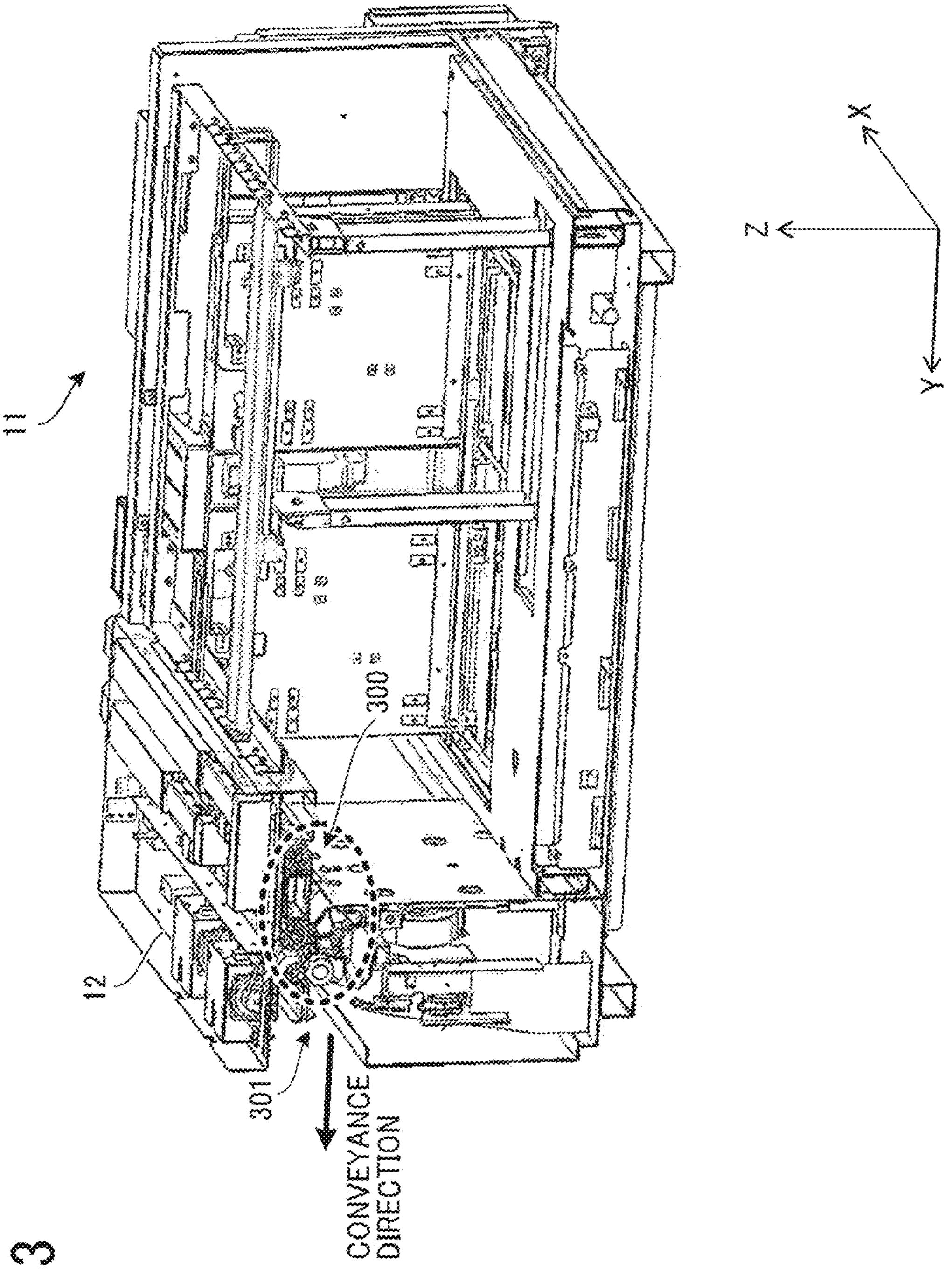
FIG. 3 is a perspective internal view of a feed tray provided for the conveyance unit of FIG. 2, according to an embodiment of the present disclosure.

FIG. 3 is a perspective internal view of the feed tray 11 provided for the conveyance unit 10 of FIG. 2, according to the present embodiment.

The conveyance unit 10 can store one or a plurality of feed trays 11. When a sheet bundle is stacked in the feed tray 11, the feed tray 11 is pulled out. Such an operation to pull out the feed tray 11 allows the feed tray 11 to be pulled out along guide rails 15. A fitted member 16 abutting on the guide rail 15 is provided on each one of lateral edges of a lower surface of the feed tray 11. Each of the fitted members 16 slides on the corresponding one of the guide rails 15. Thus, the feed tray 11 is pulled out fi-om the body of the conveyance unit 10. After the sheet bundle is stacked, the feed tray 11 is pushed to store the sheet bundle in 2C the conveyance unit 10.

As illustrated in FIGS. 2 and 3, the sheet feeder 12 according to the present embodiment is integrated with the feed tray 11, and the sheet feeder 12 is pulled out together with an operation of pulling out the feed tray 11.

As illustrated in FIG. 3, the sheet feeder 12 is positioned above a sheet ejection port 301 of the feed tray 11. The sheet feeder 12 includes a separation conveyance mechanism 300 in a region upstream from the sheet ejection port 301 within a region indicated by a broken line in FIG. 3. The separation conveyance mechanism 300 separates and conveys one sheet P fi-om a bundle of die sheets P stacked on the feed tray 11. The separation conveyance mechanism 300 separates, for example, one sheet P at the top of a bundle of the 3C sheets P in which a plurality of sheets P are stacked.

The feed tray 11 provided for the conveyance unit 10 includes a storage space for stacking and storing the sheets P A pair of sheet alignment mechanisms 110 is arranged so as to stack the sheets P stacked in the storage space at a normal position. Hereinafter, the structure of the pair of sheet alignment mechanisms 110 is described in detail.

Figure 4:
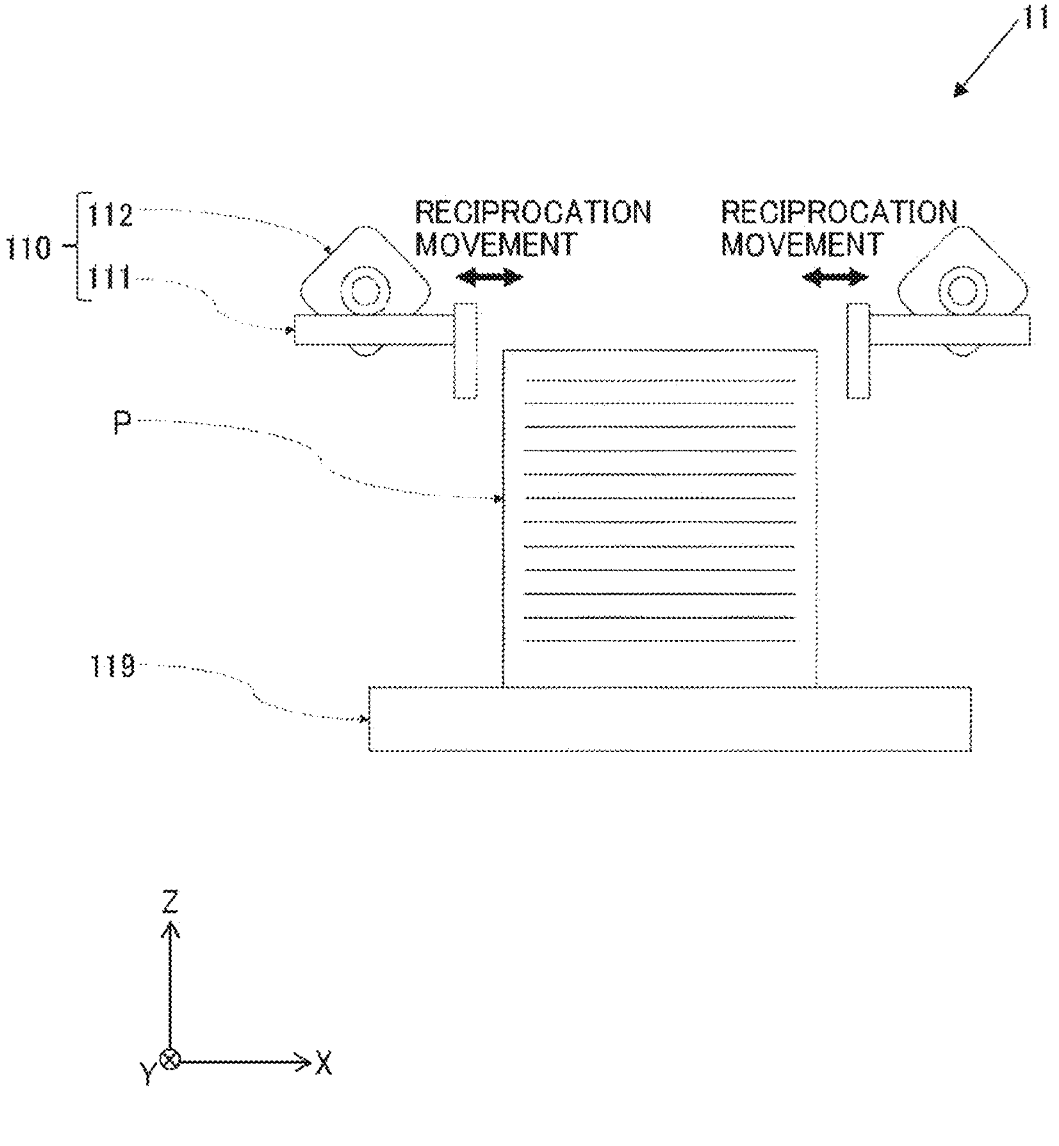
FIG. 4 is a schematic diagram of a pan of sheet alignment mechanisms provided for the conveyance unit of FIG. 2, according to an embodiment of the present disclosure.

FIG. 4 is a schematic diagram of pair of the sheet alignment mechanisms 110 provided for the feed tray 11 of the conveyance unit 10, according to the present embodiment.

The feed tray 11 includes a tray 119 as a bottom surface of the storage space for the sheets P, and the sheets P are stacked on the tray 119. The position of the tray 119 in the Z direction is variable in accordance with the stacking amount of the sheets P and is adjusted such that the sheet P stacked at an uppermost position is fed by the sheet feeder 12.

As illustrated in FIG. 4, at a position in an upper portion of the stacked sheets P, a pair of the sheet alignment mechanisms 110 that aligns the edges of the sheets P in the width direction of the sheets P is disposed so as to face each other at a position at which both edges of the sheets P in the width direction can be aligned.

Each of the pair of sheet alignment mechanisms 110 typically includes an aligning member 111 and a motor 112 that serves as a driving source. Each of the aligning members 111 reciprocates in the X direction by the operation of the motor 112. In the present embodiment, the reciprocation movement of the aligning members 111 means that each of the aligning members 111 is repeatedly moved from outside of a position at which the sheets P are stacked to the position at which the sheets P are stacked. Both lateral edges of the sheet P in the width direction are moved to positions at which the lateral edges of the sheet P are aligned by the reciprocation movement of the aligning members 111.

Each of the pair of sheet alignment mechanisms 110 is disposed at a height position at which the lateral edges of the sheets P stacked at the uppermost position can be pressed.

In the present embodiment, a disadvantage that may occur with respect to the pair of sheet alignment mechanisms 110 is described as a control sample. For example, when the size of the width of the sheets P varies in different sizes of the standard width, it is assumed that sheets P having a larger width relative to the nominal value are stacked. In this case, when the load torque applied to the aligning members 111 exceeds an allowable torque with which the motor 112 can operate, the motor 112 steps out. When the motor 112 steps out, thereafter, a deviation occurs in positions in which the aligning members 111 reciprocate. After the motor 112 has stepped out, when die sheets P that varies relative to the nominal dimension with a smaller size, i.e., sheets P having a small width, are stacked, the lateral edges of the sheets P are not pushable to the ideal position. Thus, the property in which the sheets P are aligned is deteriorated.

The pair of sheet alignment mechanisms 110 may be configured such that the aligning member 111 is disposed on a front edge and a rear edge of the sheet P in the conveyance direction so as to align the edges of the sheet P in the conveyance direction (Y direction). Thus, the aligning member 111 reciprocates in the Y direction.

The pair of sheet alignment mechanisms 110 according to the present embodiment may have a configuration that restrains the cause for which the motor 112 steps out as described above. Such a configuration of the pair of sheet alignment mechanisms 110 is described below with reference to FIG. 5.

First Embodiment

Figure 5:
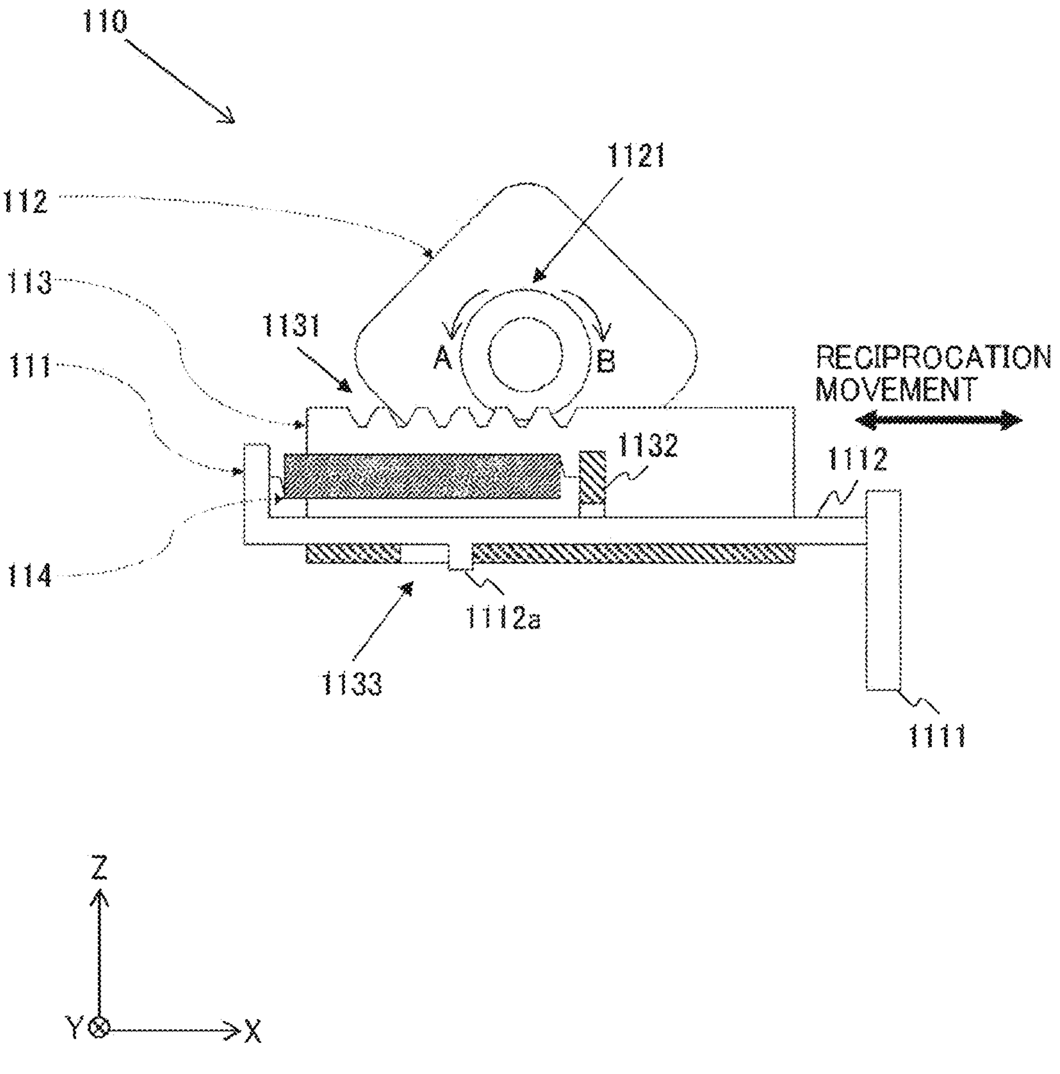
FIG. 5 is a diagram illustrating a detailed configuration of one of a pair of sheet alignment mechanisms according to a first embodiment of the present disclosure.

FIG. 5 is a diagram illustrating one of the pair of the sheet alignment mechanisms 110 according to a first embodiment of the present disclosure.

As described above, the pair of sheet alignment mechanisms 110 act on both edges of both sides of the sheet P in the width direction, or act on both the front edge and the rear edge of the sheet P in the conveyance direction. The pair of sheet alignment mechanisms 110 align a pair of edges of the sheet P parallel to each other in the width direction or in the conveyance direction. In order to achieve such functions, for example, a pair of structures that face each other are arranged as the pair of sheet alignment mechanisms 110 in the X direction or the Y direction. In FIG. 5, only one of the pair of sheet alignment mechanisms 110 is illustrated. However, the other one of the pair of sheet alignment mechanisms 110 having a similar configuration needs to be arranged in parallel so as to face the one of the pair to make up and implement the functions of the sheet alignment mechanisms 110. Hereinafter, a case in which the sheet alignment mechanisms 110 act on both edges of the sheet P in the width direction is described. The pair of the sheet alignment mechanisms 110 according to the present embodiment may act on the front edge and the rear edge of the sheet P in a similar manner.

Each one of the pair of the sheet alignment mechanisms 110 includes the aligning member 111, the motor 112 that serves as a driving source, a driver 113 that transfers the driving force of the motor 112 to the aligning member 111, and an elastic member 114.

The aligning member 111 includes an alignment pressing member 1111 and a sliding portion 1112. The alignment pressing member 1111 presses and moves the lateral edge of the sheet P to the alignment position by reciprocation movement. The sliding portion 1112 slides the alignment pressing member 1111 in the X direction. The sliding portion 1112 includes a sliding protrusion 1112*a* that moves within an opening range of a hole 1133 described later.

The motor 112 includes a rotation shalt 1121 and pinion teeth 1122 attached to the rotation shaft 1121. The motor 112 is, for example, a stepping motor, and a rotation amount and a rotation direction of the motor 112 are switched in accordance with an input pulse signal.

The driver 113 includes rack teeth that mesh with the pinion teeth 1122, an elastic force transferring portion 1132 that transfers a driving force for reciprocating the aligning member 111 via the elastic member 114, and a hole 1133.

The driver 113 receives the driving force from the motor 112 and transfers the driving force for reciprocating the aligning member 111 in the X direction to the aligning member 111.

The driver 113 and the aligning member 111 are coupled to each other through the elastic member 114, and the elastic member 114 is fixed between the driver 113 and the aligning member 111 such that the aligning member 111 and the driver 113 are stretched in a natural state. Accordingly, the driving force from the driver 113 is transferred via the elastic member 114, and the load applied during the reciprocating operation in which the aligning member 111 aligns the sheets P is alleviated by the elastic member 114 and transferred to the driver 113.

The elastic modulus of the elastic member 114 may be designed as desired such that the elastic member 114 contracts under load lower than the load of the motor torque of the motor 112.

When the rotation shaft 1121 rotates in the direction indicated by A in FIG. 5, the driver 113 moves in +X direction. Thus, the elastic force transferring portion 1132 also moves in the +X direction. One end of the elastic member 114 is fixed to the elastic force transferring portion 1132 and the other end of the elastic member 114 is fixed to the sliding portion 1112. Accordingly, when the elastic force transferring portion 1132 moves in the +X direction, a force is applied to the elastic member 114 in a direction in which the elastic member 114 is stretched. However, the sliding portion 1112 is biased by a restoring force of the elastic member 114 and moved in the +X direction. Thus, the alignment pressing member 1111 moves in the +X direction.

On the other hand, when the rotation shaft 1121 rotates in the direction indicated by B in FIG. 5, the driver 113 moves in −X direction. Thus, the elastic force transferring portion 1132 also moves in the −X direction. When the elastic force transferring portion 1132 moves in the −X direction, a force is applied to the elastic member 114 in a direction in which the elastic member 114 contracts. However, the elastic member 114 is originally fixed so as to be stretched between the driver 113 and the aligning member 111. Thus, the sliding portion 1112 is biased and moved in the −X direction. Accordingly the alignment pressing member 1111 moves m the −X direction.

For this reason, controlling the rotation direction and the rotation amount of the motor 112 allows the alignment pressing member 1111 to repeatedly press the lateral edges of the sheets P while reciprocating. Thus, the stacked sheets P can be aligned.

The movement amount of the alignment pressing member 1111 is defined by the rotation amount of the motor 112, and the rotation amount of the motor 112 is defined by the size information of the sheets P to be aligned. Accordingly, the alignment pressing member 1111 moves to a position defined in accordance with the size information of the sheets P. When the alignment pressing member 1111 presses the lateral edges of the sheet P and load is applied to the sliding portion 1112, if the load is smaller than the initial load of the elastic member 114, deformation of the elastic member 114 does not occur. Thus, the alignment operation is executed as is.

It is assumed that the size of the sheets P varies with a larger size relative to the nominal dimension. A reaction force from the sheets P is applied to the alignment pressing member 1111 and the alignment pressing member 1111 is pressed in a direction, i.e., −X direction, opposite the movement direction of the sliding portion 1112, i.e., +X direction. Thus, the sliding portion 1112 is pressed in the −X direction. When the load is larger than the initial load of the elastic member 114, the elastic member 114 is contracted.

In other words, the movement of the sliding portion 1112 in the −X direction generates a force that is applied to the elastic member 114 in the direction in which the elastic member 114 is extended. However, the elastic member 114 is contracted due to the elastic force of the elastic member 114. Thus, the reaction force that is applied to the aligning member 111 is attenuated without being directly transferred to the rotation shaft 1121 of the motor 112. In other words, the load applied to the motor 112 can be absorbed by the elastic member 114. Thus, for example, step-out of the motor 112 can be prevented even when the size of the sheets P to be aligned varies with respect to the nominal dimension. Accordingly, the reciprocation movement of the aligning members 111 can be continued. Thus, the sheet aligning property can be enhanced.

Second Embodiment

Figure 6:
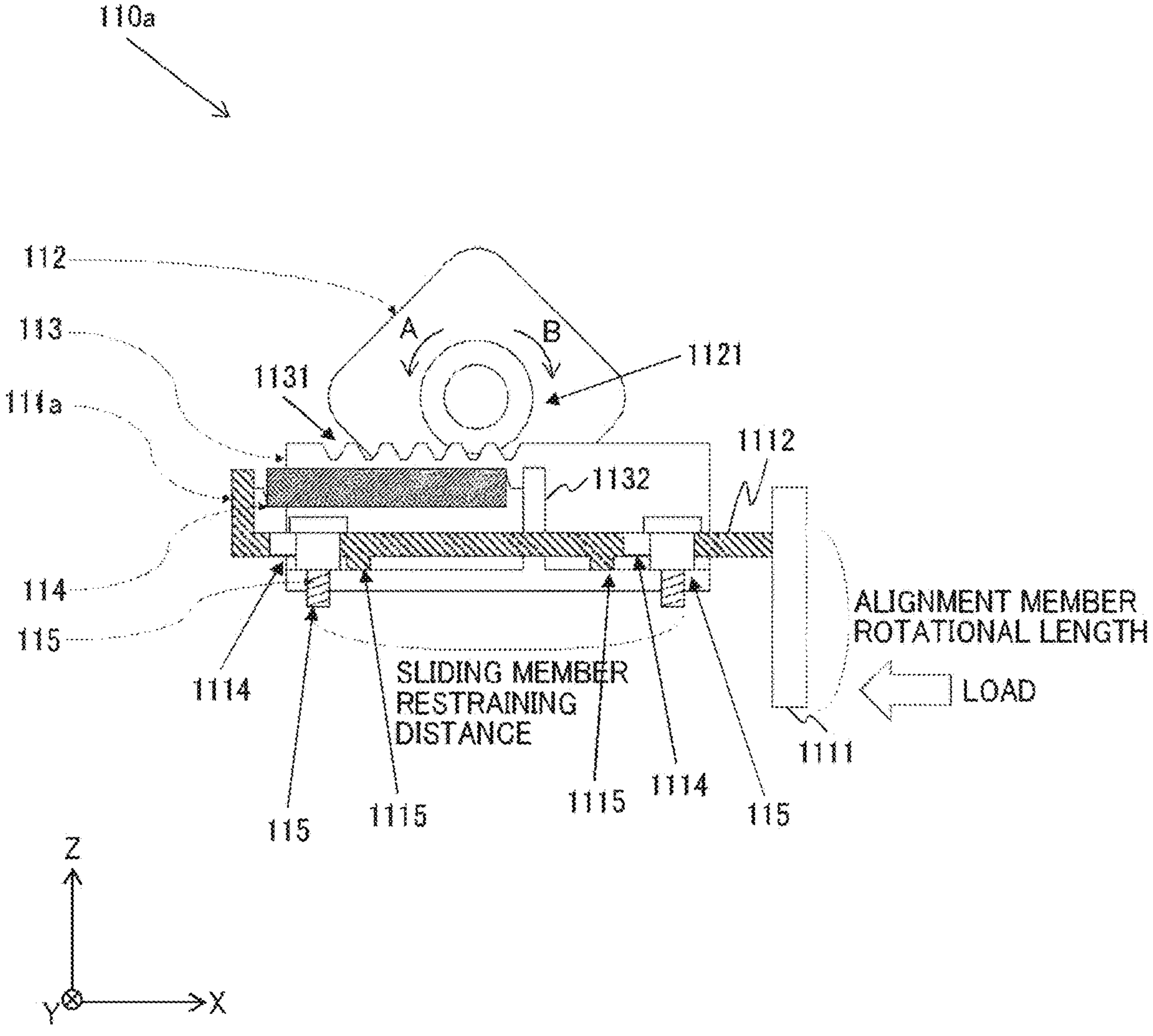
FIG. 6 is a diagram illustrating a detailed configuration of one of a pair of sheet alignment mechanisms according to a second embodiment of the present disclosure.

FIG. 6 is a diagram illustrating one of a pair of sheet alignment mechanisms 110*a* according to a second embodiment of the present disclosure.

In a similar manner to the first embodiment of the present disclosure as described above, the pair of sheet alignment mechanisms 110*a* according to the second embodiment of the present disclosure act on both edges of the sheets P in the width direction, or act on both edges of the sheet P in the length direction. Also, in the present embodiment described with reference to FIG. 6, the pair of the sheet alignment mechanisms 110*a* are disposed to face each other in the X direction. In FIG. 6, only one of die pair of the sheet alignment mechanisms 110*a* is illustrated. However, the other one of the pair of sheet alignment mechanisms 110*a* having a similar configuration needs to be arranged in parallel to make up and implement the functions of the pair of the sheet alignment mechanisms 110*a*. Hereinafter, portions different from the first embodiment is mainly described.

The sheet aligning mechanism 110*a* according to the second embodiment includes a fixing member 115 in addition to an aligning member 111*a*, the motor 112, the driver 113, and the elastic member 114.

The aligning member 111*a* includes the alignment pressing member 1111 and a sliding protrusion 1112*a*. The alignment pressing member 1111 reciprocally moves to press and move the lateral edges of the sheets P to the alignment position. The sliding protrusion 1112*a* slides die alignment pressing member 1111 in the X direction. The sliding portion 1112 includes a convex portion 1115 as a sliding surface when the sliding portion 1112 slides with respect to the driver 113.

When the aligning member 111*a* aligns the sheets P, if the reaction force from the sheets P is applied to the alignment pressing member 1111, the load applied to the alignment pressing member 1111 is the rotational torque of the aligning member 111*a*. Accordingly, the alignment pressing member 1111 cannot normally press the sheets P. There is also a possibility that the driver 113 and the aligning member 111*a* may not slide. For this reason, in the sheet alignment mechanism 110*a*, the rotation of the aligning member 111*a* due to the rotational torque of the aligning member 111*a* is restrained by the fixing member 115.

The fixing member 115 is a stepped screw in which a cylindrical portion and a fixing screw inserted into the cylindrical portion of the fixing member 115 are combined. The cylindrical portion of the fixing member 115 is inserted into an elongated hole 1114 formed in a sliding protrusion II 12*a*, and the fixing screw fixes the cylindrical portion to the driver 113.

The elongated holes 1114 are formed so as to have a distance between each of the elongated holes 1114 to restrain the sliding portion 1112 from sliding that is set to be longer than the rotational length of the alignment pressing member 1111, which is a rotational length of the alignment pressing member 1111 to restrain the rotation of the aligning member 111*a*.

The fixing member 115 determines the limit of sliding amount of the aligning member 111*a* by the distance between each of the elongated holes 1114. Accordingly, the hole 1133 formed in the driver 113 according to the first embodiment is not necessary if the distance between each of the elongated holes 1114 is set to be larger than the rotational length of the alignment pressing member 1111.

Convex portions 1115 are provided on the sliding surface to reduce friction between the aligning member 111*a* and the driver 113 during the aligning operation of the aligning member 111*a*. Such a configuration as described above allows an area of a surface on which the aligning member 111*a* and the driver 113 slide with and contact each other, i.e., the sliding surface, to be reduced. Thus, smooth sliding of the sliding portion 1112 can be achieved.

As described above, in the embodiments of the present disclosure, a configuration in which the sheet feeder 12 for separating and feeding the sheets P including the conveyance belt for conveying the sheets P with air suction is integrally detachable from the body of the image forming system 1 has been described. Accordingly, even if an attachment and detachment operation of the sheet feeder 12 is performed for maintenance or the like, it is possible to maintain the positional relation between the sheet feeder 12 and the body of the image forming system 1. Thus, multi-feeding and sheet jam of the sheets P can be prevented.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A sheet stacking apparatus comprising a pair of sheet alignment mechanisms disposed to face each other in a direction of conveyance of a sheet or in a direction orthogonal to the direction of conveyance,
- each one of the pair of sheet alignment mechanisms including:
  - an aligning member configured to reciprocate with reference to the sheet;
  - an elastic member configured to extend due to reaction force generated in response to pressing force applied to an edge of the sheet by the aligning member when a size of the sheet is larger than a prescribed size;
  - a driver coupled to the aligning member via the elastic member; and
  - a driving source configured to transfer a driving force to the driver, further comprising a fixing member fixed to the driver,
- wherein the aligning member includes:
  - a convex portion configured to face-contact the driver; and
  - an elongated hole defining a distance in which the aligning member reciprocates with respect to the sheet, and
- wherein the fixing member is inserted into the elongated hole.

2. The sheet stacking apparatus according to claim 1, wherein the driving source is a stepping motor.

3. The sheet stacking apparatus according to claim 1,
- wherein the fixing member is a stepped screw,
- wherein the stepped screw includes:
  - a cylindrical portion; and
  - a fixing screw coupled with the cylindrical portion.

4. A liquid discharging apparatus comprising:
- the sheet stacking apparatus according to claim 1; and
- a liquid discharger configured to discharge liquid to the sheet conveyed and output from the sheet stacking apparatus.

* * * * *